P. JONES.
PROCESS AND APPARATUS FOR THE SEPARATION OF OILS AND GASES.
APPLICATION FILED MAR. 30, 1916.

1,255,018.

Patented Jan. 29, 1918.

WITNESSES:
P. E. Cecil
A. McKeever

INVENTOR.
Philip Jones
BY
Geo Jatling
ATTORNEY.

UNITED STATES PATENT OFFICE.

PHILIP JONES, OF SANTA MARIA, CALIFORNIA.

PROCESS AND APPARATUS FOR THE SEPARATION OF OILS AND GASES.

1,255,018.     Specification of Letters Patent.     Patented Jan. 29, 1918.

Application filed March 30, 1916. Serial No. 87,806.

*To all whom it may concern:*

Be it known that I, PHILIP JONES, a citizen of the United States, residing at Santa Maria, in the county of Santa Barbara and State of California, have invented new and useful Improvements in Processes and Apparatus for the Separation of Oils and Gases from a Flowing Mixture Thereof, and of which the following is a specification.

This invention relates to that class of apparatus used to separate the gas and oil in a flowing mixture under such conditions of pressure as to prevent the lighter volatile constituents being passed off with the gas, these being held in the liquid oils for subsequent recovery and has application more particularly to the separation of the product from oil and gas wells flowing under pressure, although it will be obvious that it may also be used with advantage where a pressure for the separation process is artificially established or where pressure is to be employed to force the supply of the resulting gas. It has for its object the retaining within the liquid oils the lighter constituents, as for example gasolene, and consequently retaining these from the gas which passes off drier than in processes heretofore employed.

In gas and in gas and oil wells flowing under pressure there is an excess of gaseous product which under atmospheric pressure carries with it, when separated from the oil, large percentages of the lighter constituents which are extremely difficult, if not commercially impossible, of recovery from the gas on account of the large volumes that must be handled for the recovery of small quantities of the lighter constituents.

By my process I accomplish the separation under pressure and thereby prevent the gas taking up more than a small percentage of the lighter constituents, which on account of the pressure remain in the liquid state within the body of the other oils. By this means I recover a greater percentage of the lighter condensates, and the dry gas which is usually an excess by-product has still a high calorific value.

By referring to the accompanying drawings the operation of my process and the preferred form of apparatus used therein will be made clear.

Similar letters refer to similar parts throughout the figures.

Figure 1:
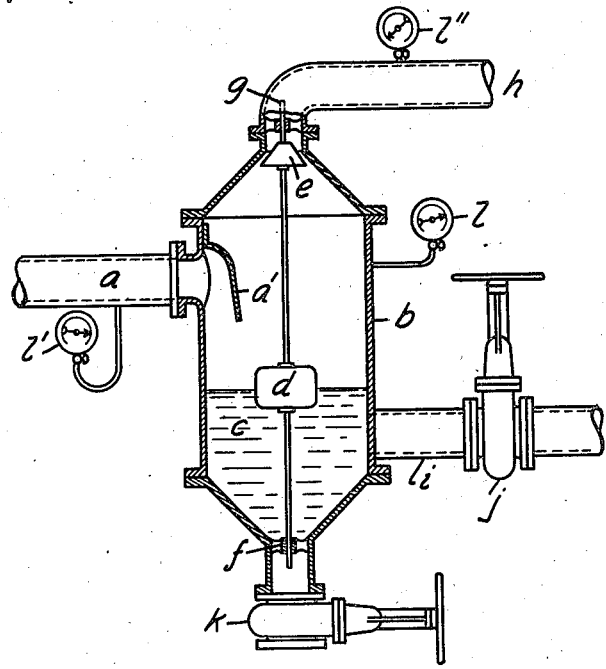
Figure 1 is a diagrammatic section showing my improved process by which a greater quantity of the lighter constituents are separated from the gas and retained with the heavier oils.

($a$) is the supply of gas and oil from the well or other source—under pressure.

($a'$) is a shield or diaphragm to direct downward the flowing mixture to make more effective the oil separation, ($o'$) is a similar diaphragm in chamber ($o$), and shown in section.

($b$) is the separator or trap chamber.

($c$) is a body of oil in the lower part of the chamber ($b$).

($d$) is a float mounted on a suitable stem and controlling the gas valve ($e$) and preferably guided at ($f$) and ($g$).

($h$) is the conduit for dry gas, and ($i$) the conduit for oil still carrying the lighter constituents retained therein due to the pressure maintained in chamber ($b$).

($j$) is the valve controlling the oil flow from ($b$) and ($j'$) is an alternative form of obstruction as a diaphragm with small hole therein, and shown in section.

($k$) is a sand valve for cleaning chamber ($b$) in which sediment, dirt and sand settle from the oil body ($c$).

($k'$) is a valve to control the injection of a part of the dry gas to saturate it with the lighter constituents for purposes of separating them from the heavier oils.

($k''$) is a by-pass valve. This valve is normally closed.

($l$), ($l'$), ($l''$) are pressure gages to indicate pressures in various stages of the process.

($m$) is an injector for dry gas which dry gas takes up and becomes saturated with the lighter constituents of the oils.

($n$) is the oil mixture tube by which the oil is conveyed by the injector nozzle ($m$) and thence into the settling chamber ($o$) in which it settles as ($q$) and is discharged therefrom, as storage under the control of the float ($p$) and valve ($p'$) through the conduit ($r$) while the saturated gas is passed off through the conduit (s) for further treatment.

The operation is as follows: see Fig. 1:—
The mixture of oil and gas under pressure (l') is conveyed through conduit (a) against the deflector (a') into the chamber (b) where due to the reduction in velocity the oils are deposited at (c) the gas remaining in the upper part of chamber (b). When the process is first started the gas flowing in (h) is restrained by a suitable valve in (h) (not shown) so as to maintain a suitable pressure as will be indicated at (l). As the oil body (c) rises the float (d) will rise therewith causing the valve (e) to come into action and partly close off the gas flow and so maintain, when properly adjusted, the suitable pressure (l) in (b) said pressure being higher than (l'') and substantially equal to (l'). The gas under pressure (l) will not retain nearly as great a percentage of the lighter constituents, the oil flow will be continuous through (i) (j) [or (j') (Fig. 2)]. Where it is desired to separate the lighter constituents from the heavy oils, I prefer to use a small percentage of the dry gas from conduit (h) and passing this intimately through the oils saturate it with the lighter constituents, as for example gasolene. This mixing of the gas and oil occurs at the nozzle (m) and tube (n) and thence against the diaphragm (o'). The heavier oils, and which are not taken up by the gas, fall to the lower part of chamber (o), as at (q) and then may be conveyed away through conduit (r) under the control of the float (p) and valve (p'). The gas from the nozzle (m), now saturated with gasolene and other light constituents, is passed off through the conduit (s) for further and well known separation treatment, the latter forming no part of my invention.

Figure 2:
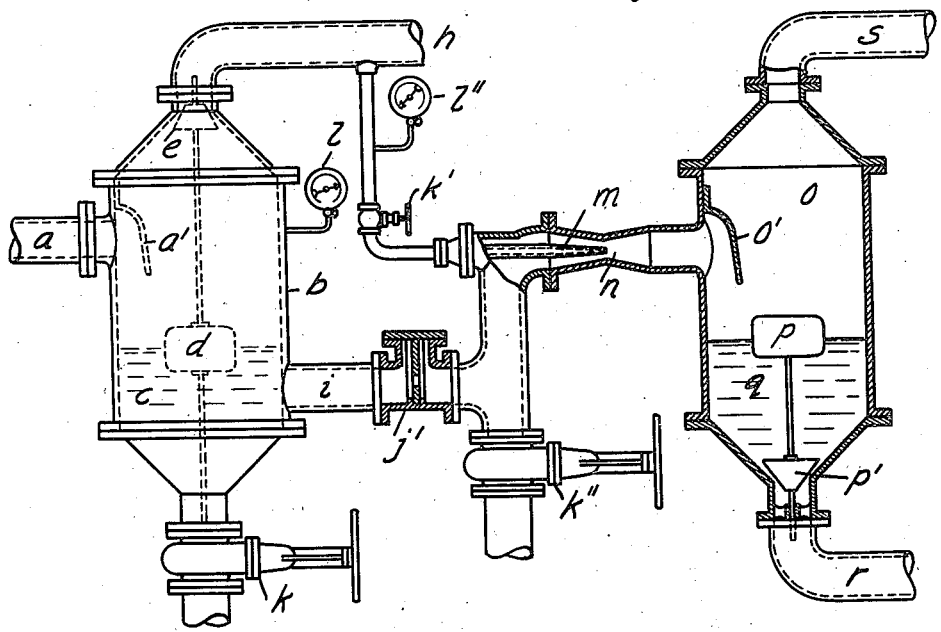
Fig. 2 is a diagrammatic view of the process carried further to simplify the separation into dry gas, saturated gas, and the heavier oils, the lighter constituents being much more readily separated from the saturated or nearly saturated gas than from the highly diluted gas.

It will be seen that the process as set forth in Fig. 1 secures a separation of a greater percentage of the light constituents from the gas, while the further step set forth in Fig. 2 employs some of the dry gas to aid in the further separation of the lighter from the heavier constituents, the former securing by a simple step the separation of dry gas and oils of light and heavy specific gravity, and the latter by one further step securing the separation of the heavy oils from the lighter, which are carried away with a small portion of the gas which has been previously separated and from which they may then be separated, there being two products from the process as shown in Fig. 1 and three products from that shown in Fig. 2.

I claim:

1. A process for the separation of mixed gas and oils under pressure consisting of reducing the velocity of the flowing mixture to permit the oils to settle by gravity thence passing the gas through a constrained passage and the oils through another constrained passage, the constraint on the gas and the constraint on the oil causing the separation to proceed under pressure above the atmosphere.

2. A process for the separation of mixed gas and oils under pressure consisting of reducing the velocity of the flowing mixture to permit the oils to settle by gravity thence passing the gas through a constrained passage and the oils through another constrained passage, the constraint on the gas and the constraint on the oil causing the separation to proceed under pressure above the atmosphere, the constraint on the gas being automatically controlled.

3. A process for the separation of mixed gas and oils under pressure consisting of reducing the velocity of the flowing mixture to permit the oils to settle by gravity thence passing the gas through a constrained passage and the oils through another constrained passage, the constraint on the gas and the constraint on the oil causing the separation to proceed under pressure above the atmosphere, the constraint on the gas being automatically controlled by the oil level.

4. A process for the recovery of lighter constituents from mixed oils and gas flowing under pressure and consisting of reducing the velocity of the mixed oils and gas in a separating chamber under pressure where their separation will occur by gravity thence passing a portion of the gas so separated through the oils previously separated, for the purpose of taking up the lighter gravity oils, and passing the remaining gas through a separate conduit, and passing the remainder of the oils through a separate conduit.

5. Apparatus for the separation of gas and oils, consisting of a receiving chamber adapted to receive the mixed oils and gas in which separation takes place by gravity, a restricted outlet for the oils, a restricted outlet for the gas.

6. Apparatus for the separation of oils and gas, consisting of a receiving chamber within which and while under pressure the oil separates from the gas by gravity, a restricted outlet for the oil, a restricted outlet for the gas.

7. Apparatus for the continuous separation of mixed oils and gas consisting of a receiving chamber within which and while under pressure above the atmosphere separation of the oils from the gas takes place by gravity, a restricted outlet for the oils, an automatically adjustable restricted outlet for the gas, the restricted outlets adapted to maintain pressure within the receiving chamber during the separation.

8. Apparatus for the continuous separation of oils and gas from the mixture thereof flowing from wells under pressure and consisting of a receiving chamber within which the mixture is introduced and maintained under pressure while separation takes place by a restricted passage for the oils, a passage for the gas with an admission valve thereto, said valve under the control of the rate of the oil separation so as to maintain the gas during separation under pressure.

PHILIP JONES.

Witnesses:
    GUY L. GOODWIN,
    EDWIN C. CORTELYOU.